United States Patent
Veryaskin

(10) Patent No.: US 6,871,542 B2
(45) Date of Patent: Mar. 29, 2005

(54) APPARATUS FOR THE MEASUREMENT OF GRAVITATIONAL GRADIENTS

(75) Inventor: Alexey Vladimirovich Veryaskin, Auckland (NZ)

(73) Assignee: Gravitec Instruments Limited, Guernsey (GB)

( * ) Notice: Subject to any disclaimer, the term of this patent is extended or adjusted under 35 U.S.C. 154(b) by 0 days.

(21) Appl. No.: 10/490,687

(22) PCT Filed: Sep. 27, 2002

(86) PCT No.: PCT/GB02/04380

§ 371 (c)(1), (2), (4) Date: Jul. 1, 2004

(87) PCT Pub. No.: WO03/027715

PCT Pub. Date: Apr. 3, 2003

(65) Prior Publication Data

US 2004/0231417 A1 Nov. 25, 2004

(30) Foreign Application Priority Data

Sep. 27, 2001 (GB) .............................. 0123270

(51) Int. Cl.⁷ ................................................. G01V 7/00
(52) U.S. Cl. .................................................... 73/382 G
(58) Field of Search ........................... 73/382 G, 382 R

(56) References Cited

U.S. PATENT DOCUMENTS

| | | |
|---|---|---|
| 2,657,581 A | 11/1953 | Fay et al. |
| 3,564,921 A | 2/1971 | Bell |
| 3,592,062 A | 7/1971 | Matbey |
| 3,611,809 A | 10/1971 | Cantat et al. |
| 3,722,284 A | 3/1973 | Weber et al. |
| 3,769,840 A | 11/1973 | Hansen |
| 5,962,781 A * | 10/1999 | Veryaskin ................. 73/382 G |

FOREIGN PATENT DOCUMENTS

WO    WO 96/10759    4/1996

* cited by examiner

*Primary Examiner*—John E. Chapman
(74) *Attorney, Agent, or Firm*—Knobbe, Martens, Olson & Bear, LLP

(57) ABSTRACT

An apparatus for the measurement of quasi-static gravity gradients comprising a flexible string and output means for producing an output which is a function of the gravity gradients, wherein the string is fixed at both ends, and wherein the apparatus comprises sensing means for detecting the transverse displacements of the string from its undisturbed reference position due to a gravity gradient around the string. The output means is responsive to the detected displacement to produce an output which is a function of the gravity gradient. The apparatus further comprises a means mounted at a position corresponding to the mid-point between the fixed ends of the string and constructed to prevent movements of the string which correspond to its odd modes (starting from C-mode) whilst not affecting at least the movement of the string which corresponds to its second fundamental mode (S-mode).

12 Claims, 6 Drawing Sheets

APPARATUS FOR THE MEASUREMENT OF GRAVITATIONAL GRADIENTS

CLAIM OF PRIORITY

This application is the U.S. National Phase of PCT/GB02/04380 filed Sep. 27, 2002 and claims priority to Great Britain Patent Application No. 0123270.14 filed Sep. 27, 2001, which are hereby incorporated herein by reference in their entirety.

BACKGROUND OF THE INVENTION

Field of the Invention

This invention relates to gravity gradiometry, particularly to a method for measuring absolutely components of the gravity gradient tensor.

SUMMARY OF THE INVENTION

Description of the Related Art

The gravity gradient tensor is a two-dimensional matrix of the second partial derivatives of a gravitational potential, V, with respect to the Cartesian co-ordinates, x, y, z, of some arbitrary reference frame. It represents how the gravity vector itself in each of these directions varies along the axes.

Accurate absolute measurements of the components of the gravity gradient tensor $T_{ij}=\partial^2_{ij}V$ (ij=x,y,z), taken at some local coordinate frame OXYZ are very important to progress in the fields of geological prospecting, mapping of the Earth's gravitational field, and space, sea and underwater navigation.

A method of absolute measurement of gravity gradient tensor components was invented first by Baron Roland von Eötvös as early as 1890, utilising a torsion balance with proof masses hung at different heights from a horizontal beam suspended by a fine filament. The gravity gradients give rise to differential forces being applied to the masses which result in a torque being exerted on the beam, and thus to angular deflection of the masses which can be detected with an appropriate sensor. A sensitivity of about 1 E (1 E=1 Eötvös=$10^{-9}$ s$^{-2}$) can be reached but measurement requires several hours at a single position due to the necessity to recalculate the gravity gradient components from at least 5 independent measurements of an angular deflection each with a different azimuth angle.

Practical devices, which have been built in accordance with this basic principle, are large in size and have low environmental noise immunity, thus requiring specially prepared conditions for measurements which excludes any possibility of using them on a moving carrier.

A method for absolute measurement of gravity gradient tensor components which enhances the above method was invented by Forward in the middle of the sixties (see U.S. Pat. Nos. 3,722,284 (Forward et al) and U.S. Pat. No. 3,769,840 (Hansen). The method comprises mounting both a dumbbell oscillator and a displacement sensor on a platform which is in uniform horizontal rotation with some frequency Ω about the axis of the torsional filament. The dumbbell then moves in forced oscillation with double the rotational frequency, whilst many of the error sources and noise sources are modulated at the rotation frequency or not modulated (particularly 1/f noise). The forced oscillation amplitude is at a maximum when the rotation frequency satisfies the resonance condition 2Ω=$\omega_0$, where $\omega_0$ is the angular resonant frequency, and the oscillator quality factor Q tends to infinity. Unlike the non-rotating method, this method enables one to determine rapidly the quantities $T_{yy}-T_{xx}$ and $T_{xy}$ by separating the quadrature components of the response using synchronous detection with a reference signal of frequency 2Ω.

The same principles can be directly used, as proposed by Metzger (see U.S. Pat. No. 3,564,921), if one replaces the dumbbell oscillator with two or more single accelerometers properly oriented on such a moving platform. There are no new features of principle in this solution to compare with the previous one except that the outputs of the pairs of accelerometers require additional balancing.

Devices have been built according to this method, but they have met more problems than advantages, principally because of the need to maintain precisely uniform rotation and the small displacement measurement with respect to the rotating frame of reference. The devices have reached a maximum working accuracy of about a few tens of Eötvös for a one second measuring interval, and they are extremely sensitive to environmental vibrational noise due to their relatively low resonant frequencies. The technological problems arising in this case are so difficult to overcome that the existing developed designs of rotating gravity gradiometers show a measurement accuracy which is much lower than the limiting theoretical estimates.

In WO96/10759 a method and apparatus for the measurement of two off-diagonal components of the gravity gradient tensor is described. According to this document, the second fundamental node (S-mode) of a stationary flexible string with fixed ends is coupled to an off-diagonal gravity gradient, whilst its first fundamental mode (C-mode) is coupled to an effective (averaged with a weight function along the string's length) transverse gravitational acceleration. In other words, a string with fixed ends is bent into its S-mode by a gravity gradient only, provided that it does not experience any angular movements. Therefore, by measuring absolutely the mechanical displacement of such string which corresponds to the S-mode it is possible to measure absolutely an off-diagonal component of the gravity gradient tensor.

Since a flexible string has two S-projections in two perpendicular vertical planes, it is possible, in principle, to measure simultaneously two off-diagonal gravity gradients, say, $T_{xz}$ and $T_{yz}$ if the Z direction of the local coordinate frame is chosen to point along the string.

If the string is not stationary, i.e. if it is placed on a moving platform, e.g. an aircraft or a ship, then either the S-mode or the C-mode of the string are both affected by the kinematic accelerations which arise by the platform's linear and angular movements.

The ability of such string to be bent into either the signal mode (S-mode) or into the parasitic mode (C-mode) at the same time introduces extra noise and special care must be taken in order to balance out the C-mode by a read-out system adjacent to said string. This problem is similar to the well known problem of balancing out the common mode of a differential accelerometer which is a traditional element for constructing mobile gravity gradiometers.

SUMMARY

It is an object of the present invention to provide an apparatus for the measurement of gravity gradients with improved sensitivity, portability and noise immunity over the above known systems.

It is a further object of the present invention to provide a novel apparatus for the absolute measurement of either off-diagonal or all components of the gravity gradient tensor, in which the effect of rotation is replaced by parametric force interaction between the sensitive element and an active feed-back loop, whereby enhanced sensitivity and noise immunity are attained.

It is another object of the present invention to provide a simple technological realisation of the above apparatus utilising the advantages of advanced cryogenic techniques which have shown an ability to provide a maximum sensitivity for mechanical displacement measurements and to keep intrinsic noise at a minimum level.

To achieve these objects the present invention provides an apparatus for the measurement of quasi-static gravity gradients, comprising:

a flexible string; arid output means for producing an output which is a function of said gravity gradients; and wherein the string is fixed at both ends; and wherein the apparatus comprises sensing means for detecting the transverse displacements of said string from its undisturbed reference position due to a gravity gradient around said string; and the output means are responsive to the detected displacement to produce said output which is a function of the gravity gradient; the apparatus further comprising means mounted at a position corresponding to the mid-point between the fixed ends of the string and constructed to prevent movements of said string which correspond to all its odd modes (starting from C-mode) whilst not affecting at least the movement of said string which corresponds to its second fundamental mode (S-mode). This is possible because for the S-mode the mid-point of the string does not move whilst for all odd modes the corresponding displacements of the string reach their maximum at that point.

By "string" no particular limitation as to material or construction is intended. Any elongate tension element is included which is capable of being transversely deflected by a gravitational field and of providing a restoring force. In one embodiment, the string is a metal strip, another, a metal wire.

An undisturbed flexible string with fixed ends forms an absolute straight line in space going through the points where the ends of the string are fixed. This line can be identified as one of the axes of the local coordinate frame, say, Z, and the other two axes, X and Y, are chosen to lie in the transverse (to the string) plane. Any string deflection from this reference position is caused by absolute values of the transverse components of the force per unit length which is applied to each unit element of the string.

The detection of the S-displacement of the string from its undisturbed reference position can be easily done by any suitable mechanical displacement sensing device.

Preferably the string is formed of highly conductive or superconducting material. In both cases, if an electric current flows through the string, a magnetic field distribution is produced in the transverse plane and along the string's length. If the string is made of a superconducting material, a larger current can be carried, and a consequent better sensitivity to the mechanical displacement can be reached. A d.c. or an a.c. current may be produced in the string by incorporating the string into a current-carrying circuit directly or by an inductive coupling with a pumping circuit (s), provided that the string forms part of a closed conducting or superconducting loop. The use of an a.c. current is advantageous in that it allows synchronous detection of the output signal.

In one embodiment, the "string" is a metal strip which only moves perpendicular to the plane of the strip. The strip may be fixed at its ends by clamps. The whole arrangement may be contained in a box made of the same material in order to match their thermal expansion coefficients.

When the string carries a current, the transverse magnetic, field around the string may interact with other inductors, possibly formed of superconducting materials, by inductive coupling. The amplitude of the current induced in an inductor adjacent to the string will be directly related to the distance of the string from that inductor. In a preferred embodiment of the invention two pick-up coils are arranged along the length of the string to act as displacement sensing means, and the current induced in each coil can act as a signal carrier current of a heterodyne-type high-frequency modulation for any low frequency displacements of the string.

In a preferred embodiment of the invention the sensing means comprises at least two sensors, possibly pick-up coils, positioned symmetrically, in the longitudinal direction, with respect to the mid-point of the string.

In another preferred embodiment, displacement sensors, for example pick-up coils, are arranged adjacent the string in two nonparallel preferably orthogonal, planes, so as to be capable of measuring the string's displacement in two transverse directions simultaneously.

Where the string is a round wire which can move in more than one plane, the means mounted at the mid-point is preferably in the form of a knife-edged ring. The tolerances involved to achieve the desired contact are very fine. If the hole is even only very slightly too large, it will not have any effect. However, if the hole is slightly too small, the string will not pass through it. The material of the string and the material of said ring must have very close thermal expansion coefficients in order to provide the steady contact. Ruby (or sapphire) and tungsten is a pair of materials which are perfectly matched with their thermal expansion coefficients.

One way of producing a ring having such small and precise dimensions is by using a diamond drill to drill into a ruby (or a similar material) block from above and below. This method results in a ruby ring having a radially inwardly facing knife edge, formed with sufficient accuracy.

Alternatively, where the string is a metal strip, two such strips may be arranged at right angles to each other. The means mounted at the mid-point of the string has the effect of filtering out all unwanted odd vibration modes without affecting dynamic properties of the wanted (S-shaped) mode. In other words, the means should provide a point-like or a knife-edged contact to the string, without exerting any forces thereon.

Where the "string" is in the form of a metal strip, this need not to be drawn through the means mounted at the mid-point. Hence, this means can be, for example, in the form of clamps with inwardly facing knife edges, mounted separately from above and below the strip. The knife edges which make the fine contact with the strip can be mounted on any material having a thermal expansion coefficient close to that of the material chosen for making the clamps, and the dimensions and coefficients of thermal expansion of the supporting structure can be selected to compensate for expansion or contraction of the strip in a direction transverse to its plane.

In order to provide a simplified mathematical description of such "confined" string, consider the displacement of a flexible string of length 1 from its undisturbed reference position, say, in the x-direction of the above local coordinate frame as a function of the z-position of a unit element and time, x(z,t). This can be described by the following differential equation $$\eta \frac{\partial^2}{\partial t^2} x(z,t) + h \frac{\partial}{\partial t} x(z,t) - \alpha \frac{\partial^2}{\partial z^2} x(z,t) + \beta \frac{\partial^4}{\partial z^4} x(z,t) = \quad (1)$$

$$= \eta [g_x(0,t) + T_{xz}(0,t)z] + \text{thermal noise}$$

with boundary conditions corresponding to the fixed ends of the string and to the condition that the mid point of the string does not move either, i.e. x(0,t)=x(l/2,t)=x(l,t)=0.

In this equation η denotes the string's mass per unit length, α and β are positive constants which determine the restoring force per unit length of the string. The quantities $g_x(0,t)$ and $T_{xz}(0,t)$ are the absolute values of the x-component of the gravitational acceleration and the corresponding gravity gradient along the string, both taken at the centre of the local coordinate plane chosen.

Since the string is subject to Brownian fluctuations, the corresponding thermal noise driving source is shown on the right side of Eq. 1.

In this description, the x-direction has been chosen as an arbitrary example to simplify the explanation of the invention. However, the foregoing and following analysis is equally applicable to any direction transverse to the string or any number of directions.

It is straightforward to show that Eq. 1 has only one possible solution which corresponds to the boundary conditions imposed upon the string, i.e. x(0,t)=x(l/2,t)=x(l,t)=0. This solution can be represented as an infinite sum over the string's discrete number of eigenfunctions which meet the boundary conditions $$x(z,t) = \sum_{n=1}^{\infty} C_x(n,t) \sin\left(\frac{2\pi n}{l} z\right) \quad (2)$$

where $C_x(n,t)$ is an amplitude of the string's displacement in the x-direction for a particular eigenmode n(n=1,2,3, ...).

By substituting Eq. (2) into Eq.(1) and multiplying both sides by sin(2πn'z/l), and then by integrating both sides over z from 0 to l, one can obtain the master equation for $C_x(n,t)$ $$\frac{d^2}{dt^2} C_x(n,t) + \frac{2}{\tau} \frac{d}{dt} C_x(n,t) + \omega_n^2 C_x(n,t) = \quad (3)$$

$$- \frac{1}{\pi n} T_{xz}(0,t) + \text{thermal noise}$$

Eq. 3 describes a conventional forced harmonic oscillator with the relaxation time τ and a particular resonant frequency $\omega_n$. The eigenfrequencies are not necessarily separated by one octave gap in the spectrum domain and depend upon the kind of string used.

It can be readily seen that the equation which governs the behaviour of such "confined" string does not contain gravitational acceleration at all. It is a directly gravity gradient sensing element upon which a direct gravity gradiometer can be built, and which will be a direct equivalent of the torsion balance, the great invention of the 19th century.

The preferable mode which gives the best sensitivity for measuring gravity gradients is the s-mode of the string (n=1). It is particularly advantageous if displacement sensors are positioned at z=l/4 and z=3l/4, positions corresponding to the maximum displacement of the string due to a gravity gradient and thus the sensing signal will also be at a maximum, giving optimum sensitivity.

According to a further development of the invention a stationary conductor may be provided adjacent and parallel to the conductive flexible string. The conductor may carry a current, which may be an a.c. current and will be further referred to as the feedback carrier current, rather than the signal carrier current described above. In a preferred embodiment the frequency of the feedback carrier current is chosen to be far low enough compared to the frequency of the signal carrier current which is directly pumped into the string. This is done in order to prevent the penetration of the feedback carrier into the detection channel provided by sensing means.

The same feedback carrier current, only modulated by a signal directly related to the demodulated output of the sensing means, can also be pumped into the string along with the signal carrier current by the use of an active feedback loop. When the feedback loop is activated, the current creates a magnetic force interaction between itself and the feedback carrier current in the stationary conductor, which has a constant amplitude provided by a feedback carrier master-oscillator. Since the magnetic force between two currents is directly proportional to their product, the string will synchronously interact with the stationary conductor, and the interaction force will be in a proportion to the demodulated output of the sensing means, i.e. in proportion to the string's displacement into its S-mode. By choosing the feedback currents to be "in-phase" or "anti-phase" it is possible to parametrically introduce a positive or a negative stiffness to the string oscillator.

In a preferred embodiment the feedback current in the string is activated periodically, in an "on-off" manner. In this way it is possible to switch periodically the S-mode of the string from a state of a low stiffness to one of a high stiffness. In other words, in the state of a high stiffness, the displacement of the string into the S-mode due to a gravity gradient is infinitesimally small and the string takes its reference position. Otherwise, when the effective stiffness of the string is low, the displacement of the string into its S-mode is maximum. This situation is similar to some extent to a variable gain operational amplifier which is switched periodically from a state of zero gain to one with a finite value. Then a DC voltage applied to its input is converted into an alternating pulse signal proportional to the DC one. By applying this kind of modulation it is possible to avoid the problems of static measurements in static gravity gradiometers and those associated with rotational modulation in rotating gravity gradiometers, and at the same time to obtain a variable output proportional to a quasi-static gravity gradient. This variable output appears to be periodic with the same period as the modulation process and, therefore, can be is locked-in to a reference feedback activation signal.

In another preferred embodiment of the invention, two or more stationary conductors, possibly superconductors, are positioned adjacent and parallel to the string in two perpendicular planes giving 2D-modulation for the simultaneous detection of two off-diagonal components of the gravity gradient tensor.

In overview, one preferred embodiment of the invention provides a novel sensor for measuring absolutely an off-diagonal component of the gravity gradient tensor by means of a flexible current-carrying string with fixed ends comprising means mounted at the mid-point of the string in order to prevent the string from being deflected and therefore from being affected by gravitational acceleration, and further comprising active force feedbacks. Such string represents a single coherent sensitive element whose first fundamental oscillation mode (S-mode) is directly coupled to a gravity gradient. The sensor is intended to be used at 77K cryogenic environment (liquid nitrogen boiling temperature) since it reduces thermal noise and much higher mechanical stability is attained.

In this particular embodiment the string forms a low-impedance part of a closed conductive circuit in which a signal carrier current source and a feedback current source are installed. The string is also inductively coupled to a differential resonant bridge tuned to the signal carrier frequency. Its inductive part consists of two pick-up coils connected in a gradiometric configuration, allowing only signals to pass which result from the string's displacement into the S-mode. The signal which results from the undisturbed string, i.e. from the position when the string is in a straight line, is attenuated by the bridge. So, the signal which appears across the bridge is a low-frequency envelope proportional to mechanical movements of the string, which is filled with the signal carrier frequency. This signal is further amplified and then is demodulated by the use of a synchronous detector. Then, the demodulated low-frequency envelope is filled again with the feedback carrier frequency and it is further conditioned in order to feed the feedback current source directly connected to the string.

BRIEF DESCRIPTION OF THE DRAWINGS

A preferred embodiment of the invention will now be described by way of example only and with reference to the following drawings in which.

DETAILED DESCRIPTION OF THE PREFERRED EMBODIMENT

Figure 2:
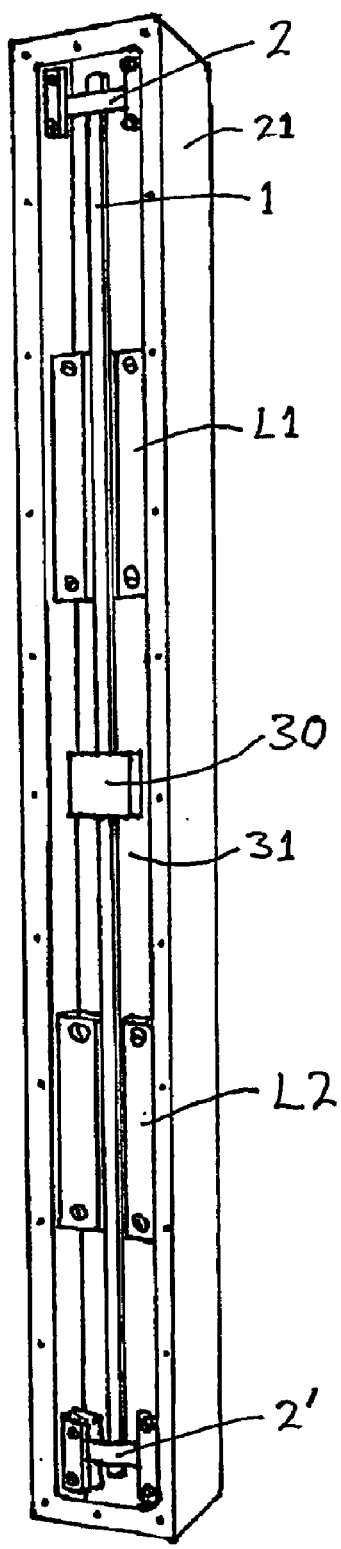
FIG. 2 is a general view of a single-axis module prototype sensor which has been built according to a preferred embodiment.

A single channel prototype of a gravity gradiometer according to the invention (see FIG. 2) has a flexible string 1 in the form of a metal strip. The string is clamped at its ends by clamps 2,2'. The whole assembly is placed inside a face-up room formed in a string housing 21 which is preferably machined out of the same material as that of the string. The room contains places reserved for the pick-up coils L1, L2 and for the means 30 (see FIG. 3) to hold the string at its mid-point. The room also contains feed-through terminals which allow the pick-up coils to be connected to the resonant bridge mounted inside a face-down room formed in the same string housing and separated from the face-up room by a solid partition 31. A stationary conductor 3 (not shown in FIG. 2) is also placed inside the face-up room adjacent and parallel to the string in order to provide the feedback interaction with the string by the use of a feedback carrier current which feeds the stationary conductor.

Figure 1:
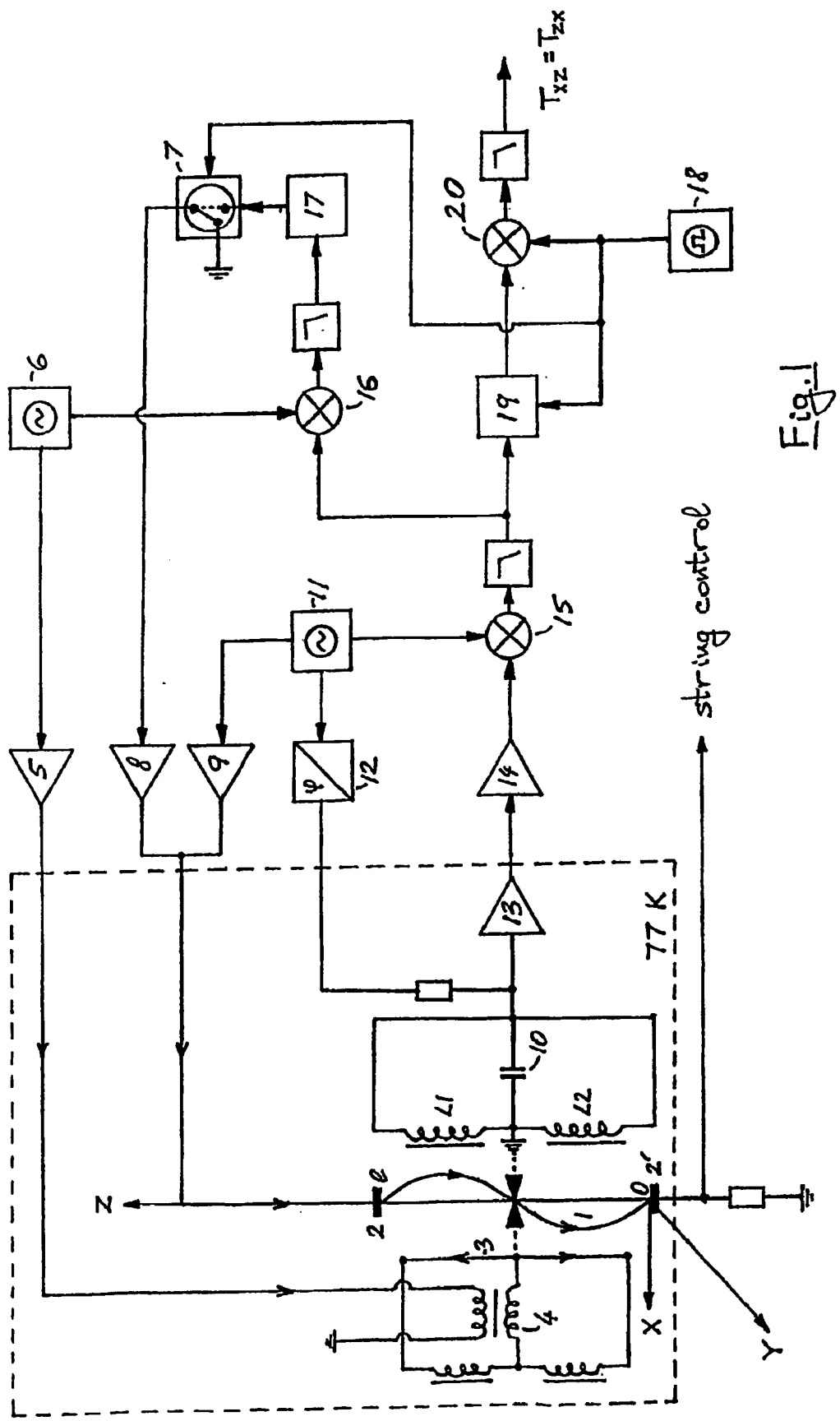
FIG. 1 is a general schematic representation of a preferred embodiment of the invention.

The flexible string 1 of a length l is deflected by a gravity gradient from its reference position, as depicted in FIG. 1, and synchronously interacts with a sinusoidal current distributed through the stationary conductor 3 close to and substantially parallel to the string. The distribution is optimum when the mid-point of the stationary conductor 3 coincides with the mid-point of the string. The feedback interaction is maximum when the length of the stationary conductor is the same as the length of the string.

The a.c. current in the stationary conductor 3 is provided by a feedback carrier master-oscillator 6 and is pumped into the stationary conductor through a buffer amplifier 5, and then further through a current transformer 4.

When the feedback signal activating switch 7 is on (in FIG. 1 it is shown in its off position), the feedback channel is directly connected to the string 1 through a feedback buffer amplifier 8 providing the interaction between the feedback current in the string and the a.c. is current in the stationary conductor 3. In FIG. 1 the currents are shown to be "in-phase", in which case the feedback interaction introduces a negative stiffness to the string oscillator and the string is further "pushed" increasing its deflection into the S-mode.

In a preferred embodiment, the a.c. current in the stationary conductor 3 and the feedback current in the string 1 are chosen to be in "anti-phase" when the feedback activating switch is on. This means that during the period of time when the feedback interaction is activated, it introduces a positive stiffness to the string oscillator and, therefore, the string is in a state of a higher stiffness. When the feedback is off, the string is in its natural state of low stiffness.

This embodiment has a particular advantage that during a measurement interval, which is the period of time when the feedback is off, the string is not affected by the back action noise which always exists in active feedbacks.

When the string is in the high stiffness state, its deflection from the straight line becomes infinitesimally small, and it takes the reference position with no gradient. Then, when the string is released from its high stiffness state, it takes the S-shape with an amplitude proportional to a static gravity gradient around the string.

The process of periodically putting the feedback "on" and "off" will modulate with the same period an a.c. voltage across the resonant bridge 10 (see FIG. 1) comprising the two pick-up coils L1, L2 and a capacitor, tuned to a signal carrier frequency provided by a signal carrier master-oscillator 11. The latter also provides a signal carrier current which is directly pumped into the string through a buffer amplifier 9. It also directly pumps the resonant bridge 10 through a phase and amplitude control unit 12 in order to minimise a carrier offset voltage across the bridge.

The periodically modulated signal carrier voltage is further amplified by a cryogenic preamplifier 13 and a room temperature amplifier 14, and is synchronously demodulated by a synchronous detector 15. Then, the output of the synchronous detector 15 is modulated again by multiplying it 16 with a feedback carrier reference signal taken from the feedback carrier master-oscillator 6. The feedback loop is closed when the resulting signal is put through a feedback conditioning unit 17 and, then, through the feedback activating switch 7 which is controlled by a pulse oscillator 18.

The output of the synchronous detector 15 is further put through a d.c. offset control unit 19 and then is locked-in to the feedback activation frequency by an end-up lock-in amplifier 20 giving the output signal proportional to a static gravity gradient around the string.

The single-axis sensor (see FIG. 2) developed according to the invention does not have any mechanical degrees of freedom coupled to gravitational or kinematic linear accelerations. This means that it can be used in any orientation including a horizontal one.

Figure 3:
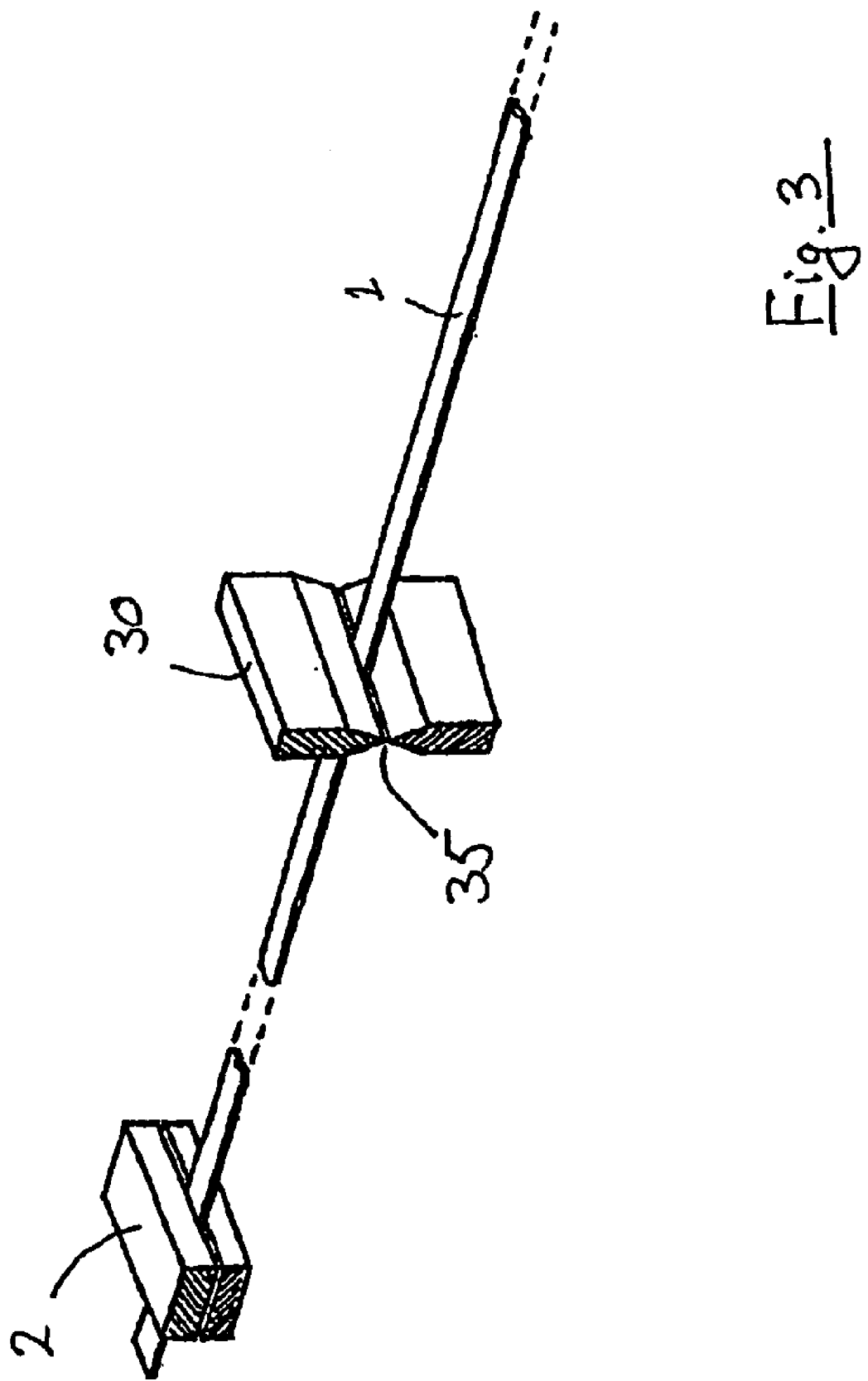
FIG. 3 is a detailed view of a strip string, clamp and knife-edge.

FIG. 3 shows detail of the knife-edge 35 of the mid-point means 30 used with a strip string 1. As mentioned above, the knife-edge contacts the string to prevent any movement out of its plane, but does not exert any force on the string. Very fine adjustment and expansion matching are therefore desirable.

Figure 4:
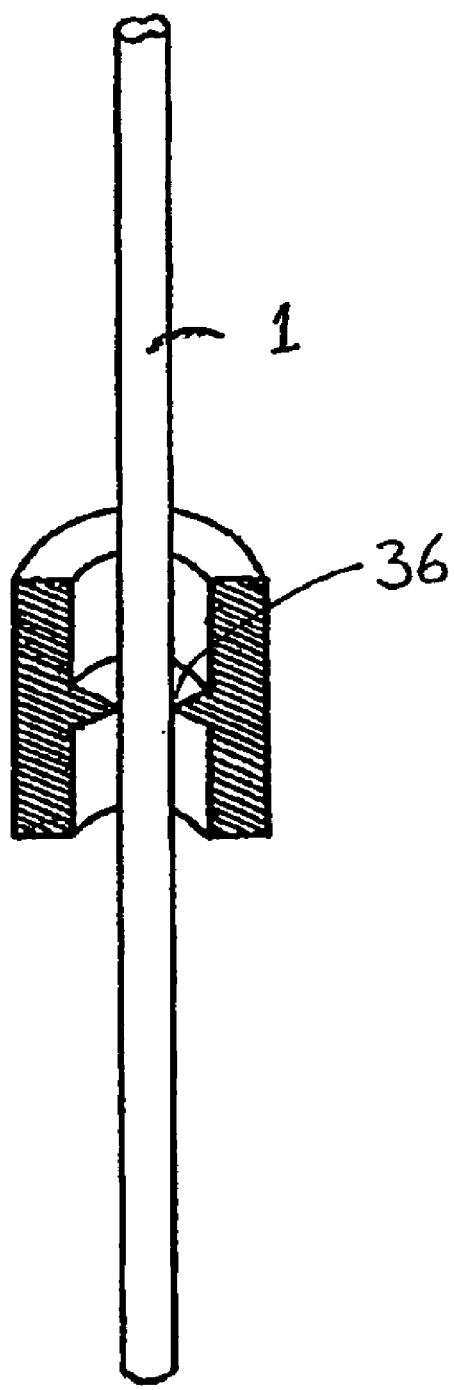
FIG. 4 is a part section of another embodiment of the invention.

FIG. 4 shows a knife-edge 36 suitable for use with a wire string 1. The knife-edge 36 is preferably machined out of a block of ruby or the like by diamond drilling from above and below. The drill forms two conical portions which intersect at a fine line.

Figure 5:
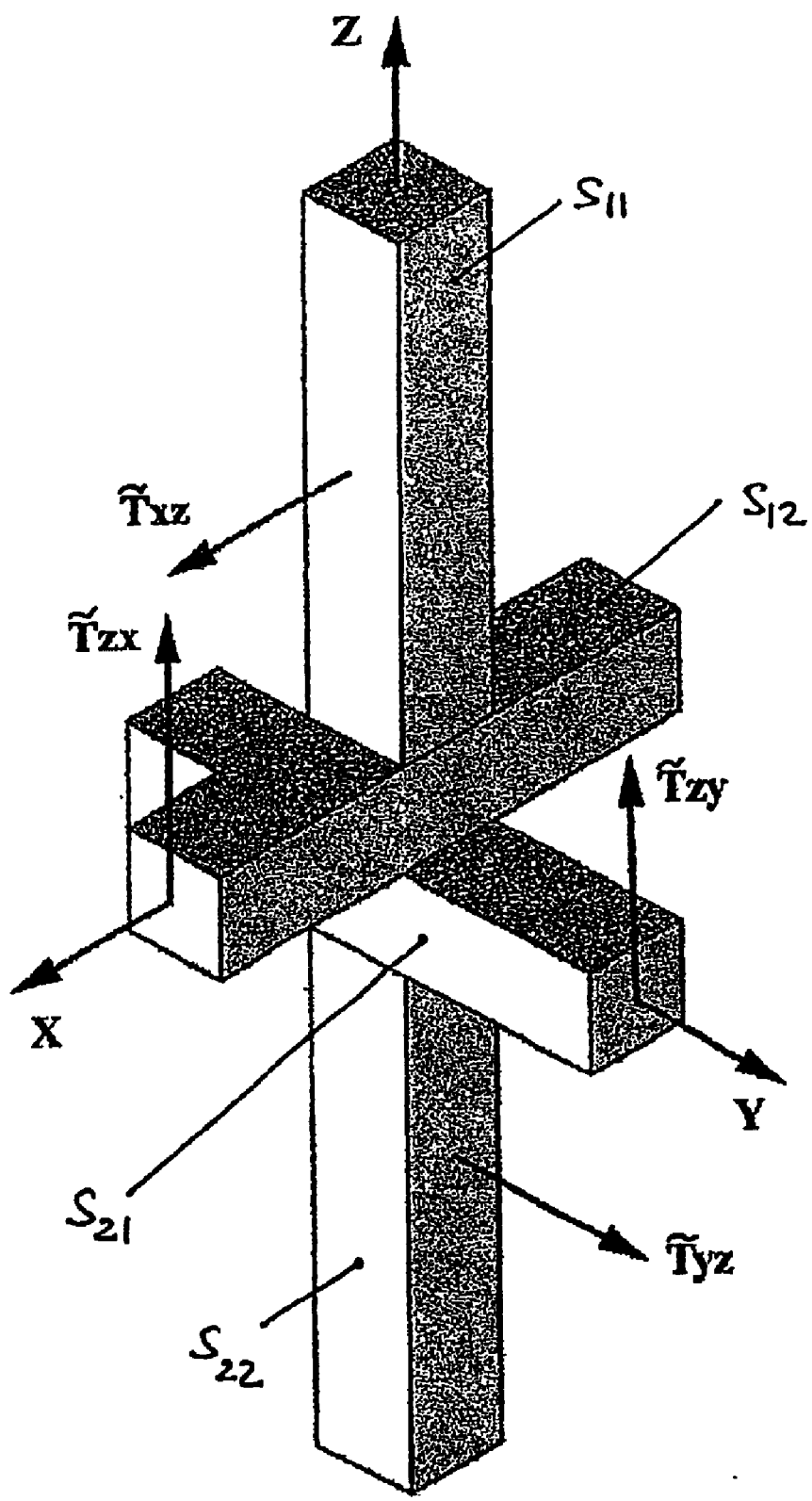
FIG. 5 shows a double channel module made of four single-axis modules which is not affected by angular accelerations, and, therefore, can be used in a strap-down mode.

A few such modules can be assembled in a configuration shown in FIG. 5. It contains two T-blocks which both are made of two single-axis modules placed perpendicular to each other. If their sensitivity axes are chosen as shown in FIG. 5, then, for example, the sensor S11 measures the following dynamic gradient $$\text{output}(S11) = \bar{T}_{xz} = T_{xz} - \Omega_x\Omega_z - \frac{\partial \Omega_Y}{\partial t}$$

where $T_{xx}$ is the true gravity gradient, and $\Omega_x$, $\Omega_y$ and $\Omega_z$ are pitch, roll and yaw rates. The output of the sensor S12 is, however, as follows $$\text{output}(S12) = \bar{T}_{zx} = T_{zx} - \Omega_z\Omega_x + \frac{\partial \Omega_Y}{\partial t}$$

Since for all gravity gradient tensor components $T_{ij}=T_{ji}$ the sum of the two above outputs yields output (S11)+output (S12)=$2T_{xz}-2\Omega_x\Omega_z$ The same consideration is applicable to the lower T-blocks which gives output(S21)+output (S22)=$2T_{yz}-2\Omega_y\Omega_z$ The quantities $\Omega_x$, $\Omega_y$ and $\Omega_z$ are contained in the above outputs as their products. Therefore, requirements for their determination are much lower compared to the case when angular accelerations must be determined. This means that the configuration shown in FIG. 5 can be used directly ("strapped down") on a mobile platform, without using a stable table. The same consideration can be attributed to the full tensor measuring system shown in FIG. 6.

Figure 6:
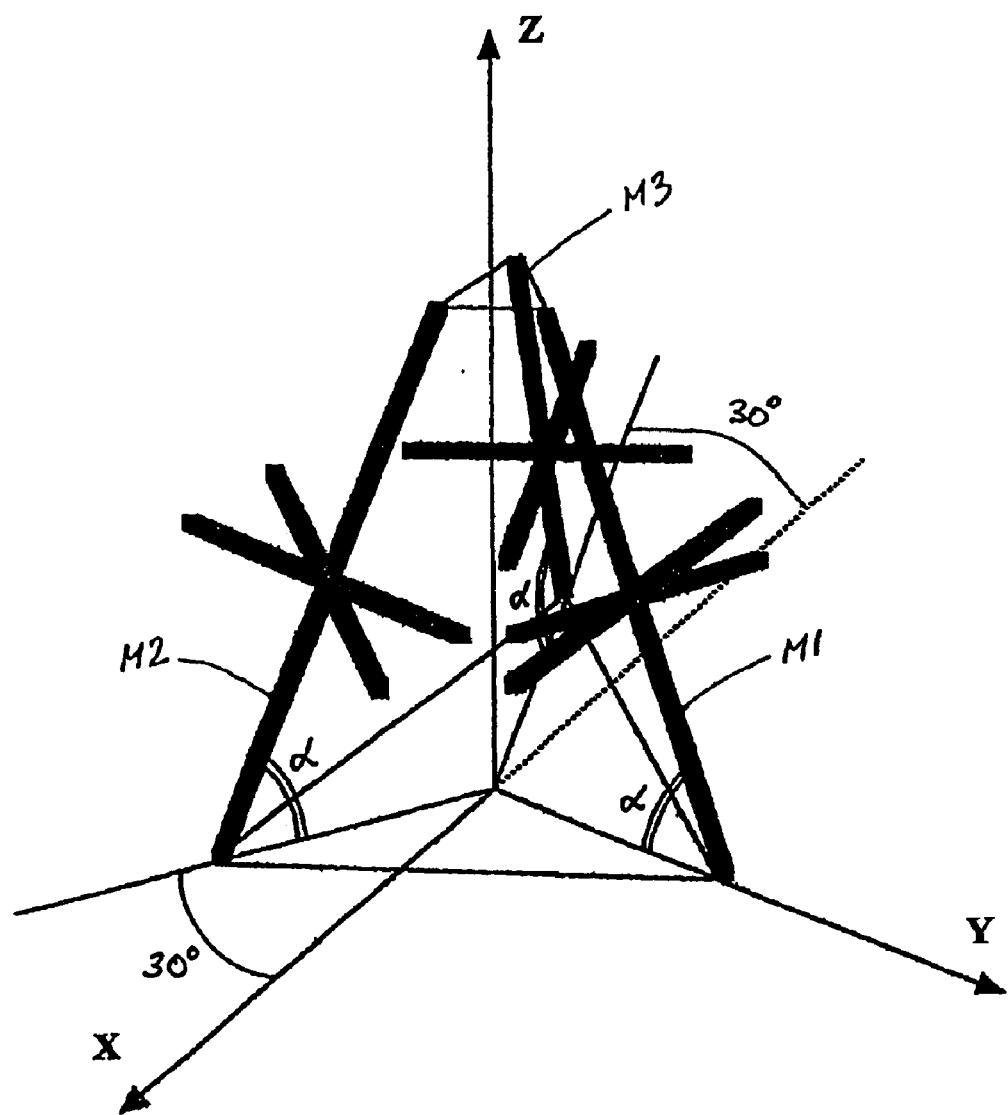
FIG. 6 shows a full tensor measuring system made of three double channel modules assembled in an umbrella configuration, which is also free of angular accelerations influence.

FIG. 6 shows three of the assemblies M1, M2, M3 of FIG. 5 assembled in an umbrella configuration to provide a full tensor measuring system which is also free of the influence of angular accelerations. The double-channel modules M1, M2, M3 are symmetrically arranged around the z-axis with module M1 in the z-y plane. The angle a can be chosen at will—a larger angle leads to a more compact assembly.

What is claimed is:

1. An apparatus for the measurement of quasi-static gravity gradients comprising:

a flexible string;

an output means for producing an output which is a function of said gravity gradients, wherein the string is fixed at both ends, and wherein the apparatus comprises sensing means for detecting the transverse displacements of said string from its undisturbed reference position due to a gravity gradient around said string; and wherein the output means are responsive to the detected displacement to produce said output which is a function of the gravity gradient; and a means mounted at a position corresponding to the mid-point between the fixed ends of the string and constructed to prevent movements of said string which correspond to its odd modes whilst not affecting at least the movement of said string which corresponds to its second fundamental mode.

2. Apparatus as claimed in claim 1, wherein said means to prevent movements comprises a knife-edge touching the string.

3. Apparatus as claimed in claim 2, wherein the string is a round wire and the means to prevent movements comprises a knife-edged ring.

4. Apparatus as claimed in claim 3, wherein the knife-edged ring is formed from a solid block bored along an axis in opposite directions to form two intersecting conical portions.

5. Apparatus as claimed in claim 1, wherein the string is formed of highly conductive or superconducting material.

6. Apparatus as claimed in claim 1, wherein the string is a metal strip which only moves perpendicular to the plane of the strip.

7. Apparatus as claimed in claim 1, wherein the sensing means comprises at least two sensors positioned symmetrically in the longitudinal direction with respect to the mid-point of the string.

8. Apparatus as claimed in claim 7, wherein displacement sensors are arranged adjacent the string in two non-parallel planes so as to be capable of measuring the string's displacement in two transverse directions simultaneously.

9. Apparatus as claimed in claim 1, wherein a current is produced in the string and the sensing means comprises pickup coils.

10. Apparatus as claimed in claim 9, wherein the current is an a.c. current and the output of the sensing means is detected by a synchronous detector.

11. Apparatus as claimed in claim 1, wherein a stationary current-carrying conductor is provided alongside the string and a corresponding current is supplied to the string so as to provide force feedback.

12. Apparatus as claimed in claim 11, wherein the feedback current is periodically activated.

* * * * *